Figure 1:
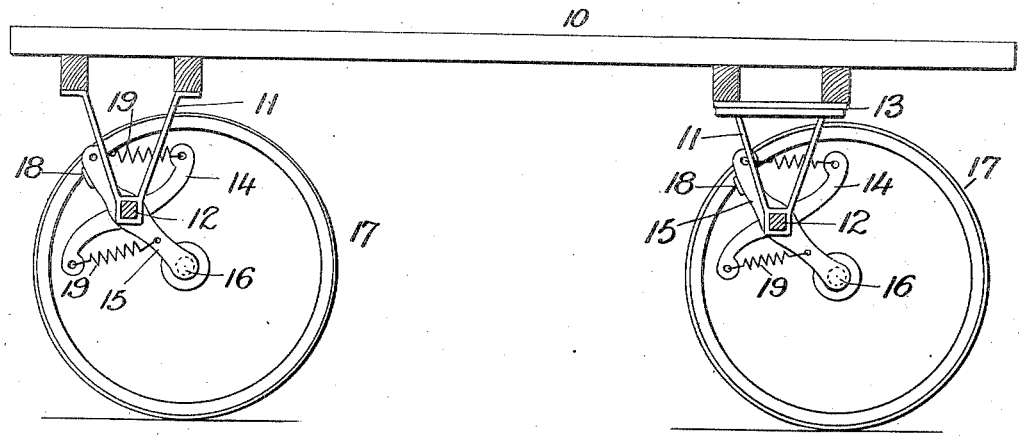

UNITED STATES PATENT OFFICE.

EDWARD BOLLBACH, OF NEW YORK, AND ANTON WAINDZIOCH, OF BROOKLYN, NEW YORK.

VEHICLE-SPRING.

No. 928,242.  Specification of Letters Patent.  Patented July 20, 1909.

Application filed February 18, 1908. Serial No. 416,490.

*To all whom it may concern:*

Be it known that we, EDWARD BOLLBACH, a citizen of the United States, and ANTON WAINDZIOCH, a subject of the Emperor of Germany, residing at New York and Brooklyn, in the counties of New York and Kings and State of New York, respectively, have invented new and useful Improvements in Vehicle-Springs, of which the following is a specification.

This invention relates to vehicle springs or more particularly to the means for mounting the wheels of a vehicle so they will be resiliently connected with the body of the wagon so the latter will always remain at the same elevation above the surface of the ground while the wheel is free to change its location from the level ground or pavement as will be more fully explained in the following specification set forth in the claims and illustrated in the drawings.

Figure 2:
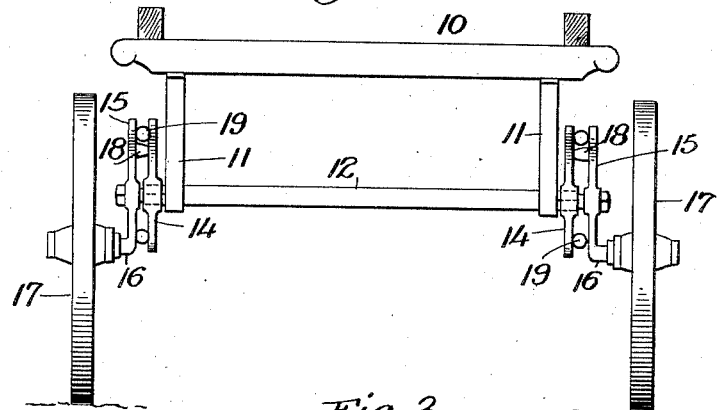
Figure 3:
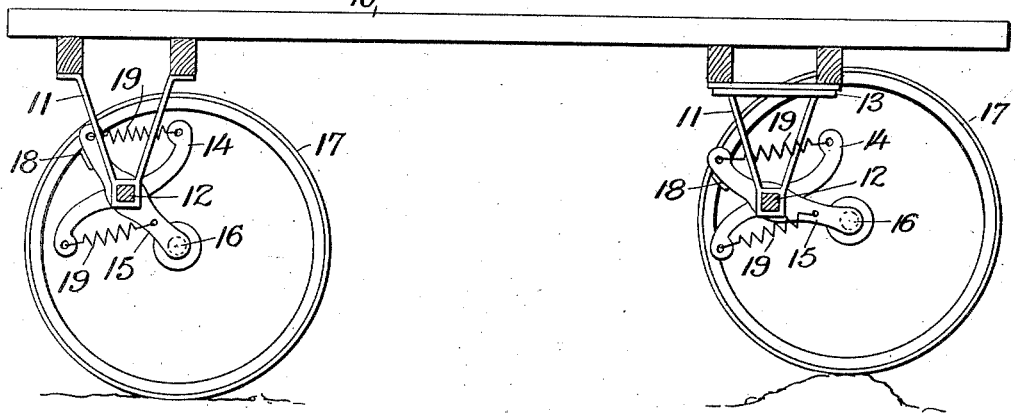

Figure 1 is a side elevation of a vehicle frame with the wheels mounted and provided with springs in accordance with this invention. Fig. 2 is an end view of same. Fig. 3 is a side elevation showing the action of the wheel in passing an obstruction.

This invention is especially adapted for use on vehicles where it is desirous that the body shall always be maintained at a certain distance above the ground and for this reason the wheel instead of being applied direct to the axle is mounted on means carried by the axle and free to move with relation to same and at the same time to be provided with the necessary resilient means to allow a certain amount of yield by the supporting means, the wheels, rather than the body itself.

Upon reference to the drawing there will be seen wheels mounted on light vehicles and depending from the frame 10 and brackets 11 which carry rigid axles 12, the forward axle having a fifth wheel 13 interposed. The ends of the axles outside of the brackets are squared and on same are fitted rigid cross arms 14 extending at substantially equal distances on each side of the axle and are perforated at each end or are otherwise provided with attaching means. The extreme ends of the axles are rounded for the reception of movable cross arms 15 with studs 16 for the reception of the wheels 17 and near the other end of the arms is a stop 18 adapted to engage the rigid arm 14 to prevent the rotation of the movable past the rigid arm.

Connecting the ends of the rigid and movable arms are springs 19 which normally hold the arms in a certain relationship depending upon the load in the vehicle and in case a wheel suddenly meets with a depression in the road the action of the springs is to force this wheel downward into the depression while the other three wheels sustain the weight of the vehicle. The wagon body is thus relieved of the jolt and jar to which ordinary vehicles are subjected while it is apparent that the cost of coil springs such as shown are far less than the elliptical springs commonly used. Fig. 3 shows how readily a wheel passes an obstruction without altering the plane of the wagon body.

What we claim as new and desire to secure by Letters Patent is:

1. A vehicle having fixed axles suspended from the bottom thereof, fixed arms carried by said axles, pivoted arms upon said axles, means upon the pivoted arms for loosely supporting vehicle wheels, means upon the pivoted arms for limiting their pivotal movement, and springs connecting the ends of the fixed arms with the said pivoted arms.

2. A vehicle having fixed axles suspended from beneath the body thereof, pivoted arms upon said axles, means upon the pivoted arms for loosely supporting vehicle wheels, means upon the pivoted arms for limiting their pivotal movement, and springs connected with said pivotal arms for normally forcing their lower ends downwardly.

3. The combination with a vehicle, of axles supported thereby, pivoted wheel supporting means upon the axles, arms secured to the axles, springs connecting the wheel supporting means with the said arms, and stops carried by the pivoted wheel supporting means adapted to engage the said arms.

In testimony whereof, we affix our signatures in presence of two witnesses.

EDWARD BOLLBACH.
ANTON WAINDZIOCH.

Witnesses:
JAMES F. DUHAMEL,
MAE W. CLINTON.